United States Patent [19]

Satomoto

[11] 4,382,546
[45] May 10, 1983

[54] TEMPERATURE RESPONSIVE VALVE DEVICE

[75] Inventor: Atsushi Satomoto, Toyota, Japan

[73] Assignee: Aisin Seiki Kabushiki Kaisha, Kariya, Japan

[21] Appl. No.: 229,828

[22] Filed: Jan. 30, 1981

[30] Foreign Application Priority Data

Feb. 8, 1980 [JP] Japan .................................. 55-15191

[51] Int. Cl.³ ............................................. G05D 23/10
[52] U.S. Cl. ................... 236/48 R; 236/87; 236/101 C
[58] Field of Search ............... 236/87, 48 R, 101 B, 236/101 C

[56] References Cited

U.S. PATENT DOCUMENTS

| | | | |
|---|---|---|---|
| 4,117,976 | 10/1978 | Doherty, Jr. ............... | 236/101 C X |
| 4,142,676 | 3/1979 | Hattori ......................... | 236/87 |
| 4,182,485 | 1/1980 | Kitamura ..................... | 236/101 C X |
| 4,247,041 | 1/1981 | Kitamura et al. ........... | 236/87 X |

*Primary Examiner*—William E. Tapolcai
*Attorney, Agent, or Firm*—Sughrue, Mion, Zinn, Macpeak & Seas

[57] ABSTRACT

The temperature responsive valve device controls a fluid passage within a valve body by opening a valve member at a low temperature, closing the valve member at an intermediate temperature and re-opening the valve member at a higher temperature. The valve member is controlled by two bimetal discs each of which is adapted to snap over center at differently selected temperatures and springs associated with the valve member and one of the bimetal discs respectively.

9 Claims, 10 Drawing Figures

TEMPERATURE RESPONSIVE VALVE DEVICE

BACKGROUND OF THE INVENTION

The present invention relates to temperature responsive valve devices and more particularly to temperature responsive valve devices having a pair of bimetal discs which are arranged to snap over center in response to changes in temperature to thereby control a fluid passage.

Various temperature responsive valve devices are known which include a bimetal disc which is adapted to snap over center in response to a change in temperature to thereby provide an on-off control for a fluid passage. That is, as the temperature increases, the bimetal disc will snap over center in one direction and as the temperature decreases, the bimetal disc will snap over center to assume its original position. When it is desired to provide a two step control for a fluid passage while the temperature is increasing, such as controlling the passage from an opened condition, to a closed condition and then to a re-opened condition in response to sequential rises in temperature, a plurality of temperature responsive valve devices have to be arranged. Such a multiplicity of temperature responsive valve devices necessarily increases the cost of the device and makes it much more difficult to assemble the plurality of temperature responsive valve devices into a limited space such as would be found in the engine compartment of a motor vehicle.

SUMMARY OF THE INVENTION

The present invention provides a new and improved temperature responsive valve device which obviates the aforementioned drawbacks associated with previously known temperature responsive valve devices.

The present invention provides a new and improved temperature responsive valve device capable of providing a two step control for a fluid passage by means of plural bimetal discs in a single valve device.

The present invention provides a new and improved temperature responsive valve device which includes two bimetal discs, one of which is diposed in operative engagement with a valve means for controlling the fluid passage through a rod interposed therebetween so that upon snapping over center in opposite directions the valve means will be brought into open and closed positions, respectively. The other bimetal disc is operatively associated with said one bimetal disc so as to move said one bimetal disc in the opening direction of the valve means when said one bimetal disc is disposed in the normal valve closing condition to override the valve closing action of said one bimetal disc. By properly selecting bimetal discs which will operate in the desired sequence as the temperature increases it is possible to control the flow of fluid by said valve means in steps according to the temperature, that is, the valve means will be positioned in the opened position at a first predetermined temperature, in the closed position at a second predetermined temperature greater than said first predetermined temperature and in the opened position at a third predetermined temperature greater than said second predetermined temperature.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
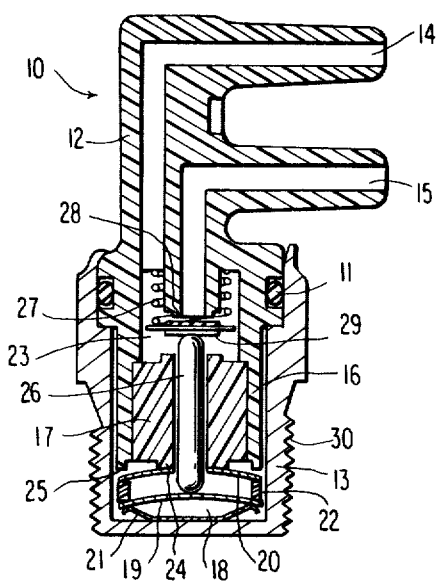
FIG. 1 is a longitudinal sectional view of a bimetal actuated temperature responsive valve assembly according to the present invention showing a first embodiment with the parts disposed in accordance with the first predetermined temperature.
Figure 4:
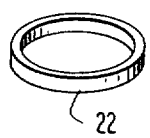
FIG. 4 is a perspective view of the bimetal spacer ring shown in FIGS. 1-3.
Figure 2:
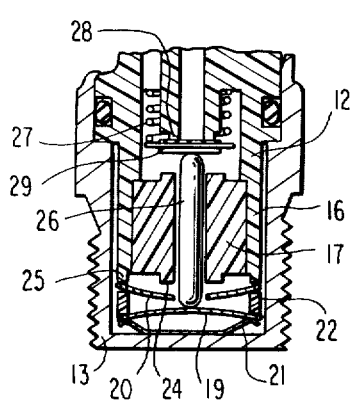
FIG. 2 is a partial sectional view similar to FIG. 1 showing the parts positioned in accordance with the second predetermined temperature higher than said first predetermined temperature.
Figure 3:
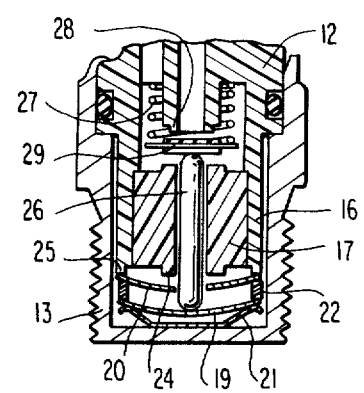
FIG. 3 is a partial sectional view similar to FIG. 2 showing the parts positioned in accordance with the third predetermined temperature greater than said second predetermined temperature.

The bimetal-actuated temperature responsive valve assembly 10 according to a first embodiment is shown in FIGS. 1-4 inclusive and is comprised of a plastic body 12 having a portion thereof located in a cup-shaped metal body 13 and sealed therein by means of an O-ring 11. The body 12 is provided with an inlet 14 adapted to be connected to a source of atmospheric pressure and an outlet port 15 which, for example is adapted to be connected to a conventional secondary-air control valve means for controlling a supply of secondary air into the exhaust manifold of an internal combustion engine. The body 12 is provided with a sleeve 16 extending into the cup-shaped body 13 and a separation member 17 of plastics material is secured in the lower end of the sleeve 16 to separate the valve chamber 23, which also acts as a fluid passage between the inlet port 14 and the outlet port 15, from a chamber 18 located in the bottom of the cup-shaped body 13. Therefore, a pair of bimetal discs 19 and 20 which are positioned within the chamber 18 will not be subjected to the temperature of the controlled fluid within the valve chamber 23. The first bimetal disc 19 is resiliently supported by a spring 21 and the second bimetal disc 20 is supported by an annular ring 22 of plastics material interposed between the disc 19 and 20. When the second bimetal 20 is disposed in the upwardly convex condition as illustrated in FIG. 1 the outer periphery of the disc 20 will be disposed in contact with the upper surface of the ring 22 and the inner periphery of the disc 20 will be disposed in contact with an annular projection 24 formed on the lower end of the isolating member 17. When the second bimetal disc 20 is disposed in the downwardly convex condition as illustrated in FIGS. 2 and 3, the upper outer peripheral surface of the disc 20 will be in engagement with the annular extension 25 on the lower end of the sleeve 16 and the lower outer peripheral surface of the disc 20 will rest on the upper surface of the ring 22. The biasing force of spring 21 is small enough so that it will not interfere with the snap-over movement of the second bimetal disc 20 from the position shown in FIG. 1 to the positions shown in FIGS. 2 and 3. A valve member 29 is disposed in valve chamber 23 between the inlet port and the outlet port for movement into and out of engagement with the valve seat 28 surrounding the outlet port 15. A spring 27 normally biases the valve member 29 downwardly to the opened position. A metal rod 26 is disposed in abutting engagement with the valve member 29 and the first bimetal disc 19 and extends through a passage in the member 17 with sufficient clearance to allow reciprocating movement of the rod 26.

The metal body 13 is screw threaded at 30 so that the valve assembly may be threaded into the wall of a water jacket of an internal combustion engine so that the temperature of the engine coolant in the water jacket controls the actuation of the bimetal discs 19 and 20. In the first embodiment, when the temperature of the engine cooling water is below a first predetermined value, both of the bimetal discs 19 and 20 will have an upwardly convex configuration as shown in FIG. 1. The downward force exerted by the bimetal disc 20 on the ring 22 in FIG. 1 is greater than the force exerted by the spring 21 so that the first bimetal disc 19 is moved against the force of the spring 21 away from the valve seat 28 so that the spring 27 will be free to bias the valve member 29 away from the seat 28 to allow fluid communication between the inlet port 14 and the outlet port 15.

When the temperature of the engine cooling water reaches a first predetermined value the second bimetal disc 20 will snap over center into the position shown in FIG. 2. The central portion of the second bimetal disc 20 will now be spaced from the projection 24 on the isolating member 17 and the outer peripheral portion of the disc 20 will be brought into contact with the lower end of extension 25 on the sleeve 16. Thus, the ring 22 and the first bimetal disc 19 will be displaced upwardly by the spring 21 a distance sufficient to cause the rod 26 which is interposed between the valve member 29 and the disc 19 to move the valve member 29 into contact with the seat 28 against the biasing force of spring 27. Thus, communication between the inlet and outlet ports 14 and 15 will be interrupted and the secondary air control valve will be in operating condition.

When the temperature of the engine cooling water reaches a second predetermined value which is higher than said first predetermined value, the first bimetal disc 19 will snap over center into the position as shown in FIG. 3. The rod 26 will move downwardly with the center portion of the disc 19 thereby allowing the spring 27 to bias the valve member 29 away from the seat 28 to thereby reestablish fluid communication between the inlet port 14 and the outlet port 15 so that the secondary air control valve will be in its non-operating condition.

Figure 5:
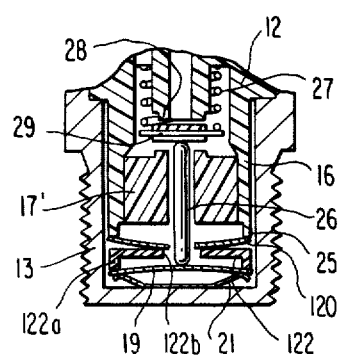
FIG. 5 is a partial sectional view of a second embodiment of a bimetal actuated temperature responsive valve assembly with the parts positioned in accordance with a first predetermined temperature.
Figure 6:
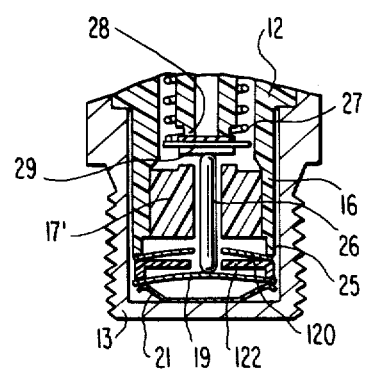
FIG. 6 is a partial sectional view similar to FIG. 5 with the parts positioned in accordance with a second predetermined temperature greater than said first predetermined temperature.
Figure 7:
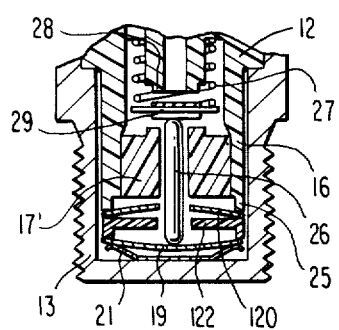
FIG. 7 is a partial sectional view similar to FIG. 6 with the parts positioned in accordance with a third predetermined temperature greater than said second predetermined temperature.

In the embodiment of FIGS. 5-7 the parts which are substantially the same as those in the previous embodiment are designated by the same reference numeral and a detailed explanation with respect to those parts will be omitted. The isolating member 17' in this embodiment is not provided with a downwardly projecting annular extension 24 and the central portion of the second bimetal disc 20 will always be spaced from the isolating member 17'. The spacer 122 is formed as an annular plate having a downwardly depending flange or projections 122a at the outer periphery thereof which are always disposed in engagement with the upper outer peripheral surface of the bimetal disc 19. When the temperature of the engine cooling water is below a first predetermined temperature, the first bimetal disc 19 has an upwardly convex configuration and the second bimetal disc 20 has a downwardly convex configuration and is disposed in contact with the plate 122 adjacent hole 122b as shown in FIG. 5. The outer peripheral portion of the second bimetal disc 120 is disposed in contact with the lower end of the extension 25 on the sleeve 16. Under these conditions the inner periphery of the second bimetal disc 20 will force the spacer 122 and the first bimetal disc downwardly against the bias of the spring 21 thereby allowing the spring 27 to move the valve member 29 away from the valve seat 28 to provide communication between the inlet and outlet ports 14 and 15.

When the temperature of the engine cooling water reaches a first predetermined value, the second bimetal disc 120 will snap over center from its position shown in FIG. 5 to its position as shown in FIG. 6 so that the central portion thereof is spaced from the plate 122. Under this condition, the first bimetal disc 19 and the plate 122 will be moved upwardly by the spring 21 and the rod 26 will move the valve member 29 into engagement with the valve seat 28 to prevent communication between the inlet and outer ports 14 and 15.

When the temperature of the engine cooling water reaches a second predetermined value which is higher than said first predetermined value, the first bimetal disc 19 will snap over center into its position as shown in FIG. 7 thereby allowing the rod 26 to move downwardly so that the spring 27 can move the valve disc 29 to the open position allowing communication between the inlet and outlet ports 14 and 15.

Figure 8:
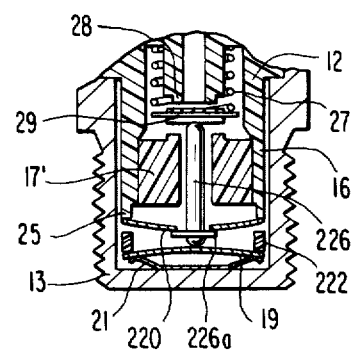
FIG. 8 is a partial sectional view of the third embodiment of a bimetal actuated temperature responsive valve assembly with the parts positioned in accordance with a first predetermined temperature.
Figure 9:
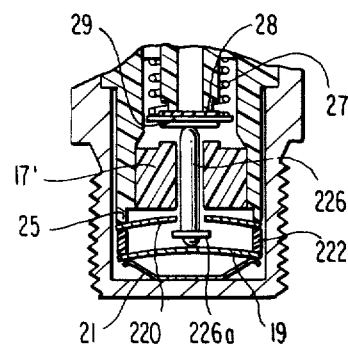
FIG. 9 is a partial sectional view similar to FIG. 8 with the parts positioned in accordance with a second predetermined temperature greater than said first predetermined temperature.
Figure 10:
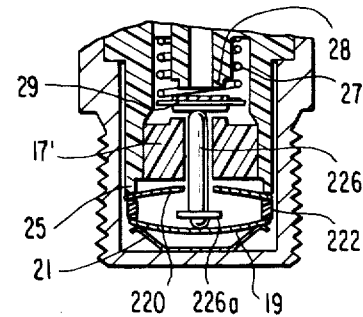
FIG. 10 is a partial sectional view similar to FIG. 9 with the parts positioned in accordance with a third predetermined temperature greater than said second predetermined temperature.

FIGS. 8-10 inclusive show a further embodiment of the present invention wherein the parts which are substantially the same as those in the previous embodiments are illustrated by the same reference numerals. Therefore, a detailed explanation of these parts will be omitted. In this embodiment, the rod 226 is provided with a rim or flange 226a which is positioned between the first and second bimetal discs 19 and 220, respectively. When the temperature of the engine cooling water is below a first predetermined value the first bimetal disc 19 will have upwardly convex configuration and the second bimetal disc 220 will have a downwardly convex configuration as shown in FIG. 8. The outer periphery of the second bimetal disc 220 will be disposed in contact with the lower end of the extension 25 of sleeve 16 and the central portion thereof will be disposed in contact with the flange 226a on rod 226. Thus, the central portion of the second bimetal disc 220 will cause the rod 226 and the bimetal disc 19 to move downwardly against the force of the spring 21 thereby allowing the spring 27 to unseat the valve disc 29 from the valve seat 28. Under these conditions, the annular ring 222 which rests on the outer periphery of the first bimetal disc 19 will be spaced from the outer periphery of the second bimetal disc 220.

When the temperature of the engine cooling water reaches the first predetermined value the second bimetal disc 220 will snap over center into the position as shown in FIG. 9 so that the central portion thereof will be spaced from the flange 226a on the rod 226. Thus, the first bimetal disc 19, rod 226 and valve disc 29 will be moved upwardly by the spring 21 to bring the valve disc 29 into engagement with the valve seat 28 thereby interrupting fluid communication between the inlet and outlet ports 14 and 15. Under these conditions, the annular spacer ring 222 will be disposed in engagement with the outer periphery of the first bimetal disc 19 and the second bimetal disc 220.

When the temperature of the engine cooling water reaches a second predetermined value which is higher than the first predetermined value the first bimetal disc 19 will snap over center into the position as shown in FIG. 10 thereby allowing the spring 27 to move the valve disc 29 and the rod 226 downwardly to establish communication between the inlet and outlet ports 14 and 15.

While the invention has been particularly shown and described with reference to preferred embodiments thereof, it will be understood by those in the art that the foregoing and other changes in form and details may be made therein without departing from the spirit and scope of the invention.

What is claimed is:

1. A temperature responsive valve device comprising a body having an inlet port and an outlet port, a valve chamber within said body connecting said inlet port with said outlet port, valve means located in said valve chamber to open and close communication between said inlet port and said outlet port, first and second bimetal temperature responsive discs located in a further chamber in said body, a rod extending between and disposed in engagement with said valve means and said first bimetal disc, said first bimetal disc being adapted to snap over center in response to a first temperature between a first position to urge said valve means in the closing direction through said rod and a second position to allow said valve means to move in the opening direction, spring means for supporting said first bimetal disc and biasing said first bimetal disc, said rod and said valve means in the closing direction, said second bimetal disc adapted to snap over center in response to a second temperature lower than said first temperature between a first position forcing said first bimetal disc against said spring means to allow said valve means to move in the opening direction when said first bimetal disc is in its first position and a second position wherein said second bimetal disc exerts no force on said first bimetal disc whereby said valve means may move from an open condition, to a closed condition and then to a reopened condition in sequence in response to sequential changes in temperature.

2. A temperature responsive valve device as set forth in claim 1, further comprising movable annular spacer means disposed between said first and second bimetal discs so that when said second bimetal disc is in its first position said second bimetal disc will force said first bimetal disc against said spring means through said spacer means.

3. A temperature responsive valve device as set forth in claim 1, further comprising flange means on said rod disposed intermediate said first and second bimetal discs so that when said second bimetal disc is in its first position said second bimetal disc will force said first bimetal disc against said spring means through said rod.

4. A temperature responsive valve device as set forth in claim 2, wherein said annular spacer means is comprised of an annular ring disposed in continuous engagement with the outer periphery of said first and second discs.

5. A temperature responsive valve device as set forth in claim 2, wherein said annular spacer means is comprised of an annular plate having downwardly projecting means adjacent the outer periphery thereof and a central aperture to permit axial movement of said rod, said downwardly projecting means being disposed in engagement with the outer periphery of said first bimetal disc and said second bimetal disc being disposed in engagement with the inner periphery of said spacer means adjacent said aperture in said first position of said second bimetal disc.

6. A temperature responsive valve device as set forth in claim 3, further comprising movable annular spacer means disposed between said first and second bimetal discs wherein said spacer means is comprised of an annular ring disposed intermediate said first and second bimetal discs in engagement with the outer periphery thereof when said second bimetal disc is disposed in its second position.

7. A temperature responsive valve device as set forth in claim 4, wherein said first and second bimetal discs are disposed in an upwardly convex configuration when the temperature is below a first predetermined value, said first bimetal disc is disposed in an upwardly convex configuration and said second bimetal disc is disposed in a downwardly convex configuration when said temperature is above said first predetermined value and said first and second bimetal discs are disposed in a downwardly convex configuration when said temperature is above a second predetermined value greater than said first predetermined value.

8. A temperature responsive valve device as set forth in claim 5, wherein said first bimetal disc is disposed in an upwardly convex configuration and said second bimetal disc is disposed in a downwardly convex configuration when the temperature is below a first predetermined value, said first and second bimetal discs are disposed in an upwardly convex configuration when said temperature is above said first predetermined value and said first bimetal disc is disposed in a downwardly convex configuration and said second bimetal disc is disposed in an upwardly convex configuration when said temperature is above a second predetermined value greater than said first predetermined value.

9. A temperature responsive valve device as set forth in claim 6, wherein said first bimetal disc is disposed in an upwardly convex configuration and said second bimetal disc is disposed in a downwardly convex configuration when the temperature is below a first predetermined value, said first and second bimetal discs are disposed in an upwardly convex configuration when said temperature is disposed above said first predetermined value and said first bimetal disc is disposed in a downwardly convex configuration and said second bimetal disc is disposed in an upwardly convex configuration when said temperature is above a second predetermined value greater than said first predetermined value.

* * * * *